United States Patent
Hwang et al.

(10) Patent No.: US 10,545,363 B2
(45) Date of Patent: Jan. 28, 2020

(54) DISPLAY DEVICE HAVING INTEGRAL SELF-CAPACITANCE TOUCH SENSOR

(71) Applicant: LG Display Co., Ltd., Seoul (KR)

(72) Inventors: Sang Soo Hwang, Seoul (KR); Min Su Kim, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 15/531,530

(22) PCT Filed: Oct. 29, 2015

(86) PCT No.: PCT/KR2015/011504
§ 371 (c)(1),
(2) Date: May 30, 2017

(87) PCT Pub. No.: WO2016/089014
PCT Pub. Date: Jun. 9, 2016

(65) Prior Publication Data
US 2017/0329444 A1 Nov. 16, 2017

(30) Foreign Application Priority Data
Dec. 5, 2014 (KR) ........................ 10-2014-0174249

(51) Int. Cl.
*G02F 1/1333* (2006.01)
*G06F 3/044* (2006.01)
(Continued)

(52) U.S. Cl.
CPC .... *G02F 1/13338* (2013.01); *G02F 1/133345* (2013.01); *G02F 1/133512* (2013.01);
(Continued)

(58) Field of Classification Search
CPC ................. G06F 3/0412; G06F 3/044; G06F 2203/04104; G06F 2203/04111;
(Continued)

(56) References Cited

U.S. PATENT DOCUMENTS

2005/0264749 A1* 12/2005 Lee .................. G02F 1/1333
349/156
2007/0070286 A1* 3/2007 Cho .................. G02F 1/13394
349/156
(Continued)

FOREIGN PATENT DOCUMENTS

| KR | 10-2011-0075411 A | 7/2011 |
| KR | 10-2012-0097761 A | 9/2012 |
| KR | 10-2013-0015584 A | 2/2013 |
| KR | 10-2014-0076841 A | 6/2014 |

OTHER PUBLICATIONS

International Search Report dated Apr. 22, 2016 for corresponding International Patent Application No. PCT/KR2015/011504.

*Primary Examiner* — Shan Liu
(74) *Attorney, Agent, or Firm* — Morgan, Lewis & Bockius LLP

(57) ABSTRACT

The present invention relates to a display device having an integral self-capacitance touch sensor, which can enhance a display property and touch performance by reducing parasitic capacitance and resistance, comprising: a plurality of gate lines and a plurality of data lines that are arranged on a first substrate to cross each other; a plurality of pixel electrodes that are connected to the plurality of gate lines and data lines; a plurality of common and touch electrodes, each of which is formed to overlap some of the plurality of pixel electrodes; and a plurality of routing wires connected to the plurality of common and touch electrodes, respectively, to extend parallel to each other, wherein the plurality of routing wires overlap the data lines with a first insulation film therebetween for covering the data lines, or overlap the gate lines that cross the data lines, and the common and touch electrodes are connected to the routing wires, respectively, through contact holes formed through a second insulation film that covers the routing wires.

4 Claims, 4 Drawing Sheets

(51) Int. Cl.
   *G02F 1/1335* (2006.01)
   *G02F 1/1343* (2006.01)
   *G02F 1/1362* (2006.01)
   *G06F 3/041* (2006.01)

(52) U.S. Cl.
   CPC .. *G02F 1/134363* (2013.01); *G02F 1/136286* (2013.01); *G06F 3/044* (2013.01); *G06F 3/0412* (2013.01); *G02F 2001/134372* (2013.01); *G02F 2201/121* (2013.01); *G02F 2201/123* (2013.01); *G06F 2203/04104* (2013.01); *G06F 2203/04111* (2013.01)

(58) Field of Classification Search
   CPC ........ G06F 3/0421; G06F 3/045; G06F 3/041; G06F 3/0414; G06F 3/0416; G06F 3/0488; G06F 2203/04107; G06F 2203/04103; G06F 2203/041; G06F 3/03547; G06F 3/0418; G06F 3/046; G06F 3/047; G02F 1/133512; G02F 1/13338; G02F 1/134363; G02F 1/133345; G02F 1/136286; G02F 2201/121; G02F 2001/134372; G02F 2201/123; G02F 1/133514; G02F 2001/13312; G06K 11/06; H05K 9/0079; H05K 9/0073; H05K 9/0081; H05K 9/0088
   USPC ............................................ 349/12; 345/173
   See application file for complete search history.

(56) References Cited

U.S. PATENT DOCUMENTS

| | | | |
|---|---|---|---|
| 2008/0137017 A1* | 6/2008 | Arai | G02F 1/134363 349/139 |
| 2009/0059110 A1* | 3/2009 | Sasaki | G02F 1/134363 349/39 |
| 2010/0073301 A1 | 3/2010 | Yousefpor et al. | |
| 2011/0157039 A1 | 6/2011 | Shin et al. | |
| 2011/0254009 A1* | 10/2011 | Ohtani | G02F 1/136227 257/59 |
| 2012/0218199 A1* | 8/2012 | Kim | G06F 3/0412 345/173 |
| 2012/0218482 A1 | 8/2012 | Hwang et al. | |
| 2012/0268699 A1* | 10/2012 | Min | G02F 1/13394 349/106 |
| 2013/0021553 A1* | 1/2013 | Satoh | G02F 1/136227 349/43 |
| 2014/0009711 A1* | 1/2014 | Tomioka | G02F 1/134363 349/43 |
| 2014/0110677 A1* | 4/2014 | Zhang | H01L 51/0022 257/40 |
| 2014/0168149 A1 | 6/2014 | Han et al. | |
| 2014/0299881 A1* | 10/2014 | Oda | H01L 27/124 257/59 |
| 2016/0048241 A1* | 2/2016 | Zhao | G06F 3/0412 345/174 |
| 2016/0062203 A1* | 3/2016 | Ono | G02F 1/134363 349/43 |
| 2016/0246398 A1* | 8/2016 | Huang | G06F 3/044 |
| 2016/0246399 A1* | 8/2016 | Huang | G06F 3/044 |
| 2016/0259445 A1* | 9/2016 | Yang | G06F 3/044 |
| 2016/0294386 A1* | 10/2016 | Yang | G06F 3/0416 |

* cited by examiner

DISPLAY DEVICE HAVING INTEGRAL SELF-CAPACITANCE TOUCH SENSOR

TECHNICAL FIELD

This disclosure relates to a touch sensor integrated type display device, in particular, and more particularly to a self-capacitive touch sensor integrated type display device capable of enhancing a display property and a touch performance.

BACKGROUND ART

In recent years, various input devices such as a keyboard, a mouse, a joystick, and a digitizer have been used to construct interfaces between users and home appliances or information telecommunication devices. However, when the user makes use of these input devices, user's dissatisfaction increases because the user is required to know how to use the input devices and the input devices occupy space. Therefore, a convenient and simple input device that can reduce erroneous operation is required. In response to this demand, a touch sensor for enabling the user to input information by approaching or directly touching the screen with his or her hand or a pen has been suggested.

The touch sensor has a simple configuration capable of reducing erroneous operations. The user can also perform an input action without using a separate input device, and can quickly and easily manipulate a device through contents displayed on the screen. Accordingly, the touch sensor has been applied to various display devices.

The touch sensor used in the display devices may be classified into an add-on type touch sensor and an on-cell type touch sensor depending on construction thereof. The add-on type touch sensor is configured such that the display device and the add-on type touch sensor are individually manufactured and then the add-on type touch sensor is attached to an upper substrate of the display device. The on-cell type touch sensor is configured such that components constituting the on-cell type touch sensor are directly formed on the surface of the upper substrate of the display device.

There is a problem that a thickness of the display device increases because the add-on type touch sensor has the structure in which the add-on type touch sensor is mounted on the display device. Further, the visibility of the display device is reduced because of a reduction in brightness of the display device due to the increased thickness.

On the other hand, the on-cell type touch sensor shares the glass substrate with the display device because the on-cell type touch sensor has the structure in which the on-cell type touch sensor is formed on the surface of the upper substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor.

Integrated type (or in-cell type) touch sensors can solve the problems generated in the add-on type touch sensor and the on-cell type touch sensor because of the advantages of the thin profile and the durability improvement. A mutual capacitive type touch sensor among the integrated type (or in-cell type) touch sensors is configured to such that X-axis electrode lines (for example, driving electrode lines) and Y-axis electrode lines (for example, sensing electrode lines) cross over each other in a touch electrode formation area of a touch sensing panel to form a matrix, a driving pulse is applied to the X-axis electrode lines, and changes in voltages generated in sensing nodes defined as crossings of the X-axis electrode lines and the Y-axis electrode lines are sensed through the Y-axis electrode lines, thereby deciding whether or not a touch operation is performed.

In the mutual capacitive touch sensor, a mutual capacitance generated in touch recognition of the mutual capacitive touch sensor is very small, but a parasitic capacitance between gate line and data lines constituting the display device is very large. Therefore, it is difficult to accurately recognize a touch position because of the parasitic capacitance.

Further, because a plurality of touch driving lines for a touch drive and a plurality of touch sensing lines for a touch sensing have to be formed on the common electrode for multi-touch recognition of the mutual capacitive touch sensor, the mutual capacitive touch sensor requires a very complex line structure.

DETAILED DESCRIPTION OF THIS DISCLOSURE

Technical Problem

An object of this disclosure is to provide a self-capacitive touch sensor integrated type display device capable of simply and efficiently forming complicated routing wires connected to common-touch electrodes, which is a problem of the mutual capacitive touch sensor.

Another object of this disclosure is to provide a self-capacitive touch sensor integrated type display device capable of improving a display performance and a touch sensitivity by reducing the parasitic capacitance formed between the common-touch electrodes and routing wires and the resistance of the routing wires.

Means for Resolving the Problem

To achieve the above objects, a self-capacitive touch sensor integrated type display device comprises a plurality of gate lines and a plurality of data lines arranged to cross over each other on a first substrate; a plurality of pixel electrodes connected to the plurality of gate lines and the plurality of data lines; a plurality of common-touch electrodes, each being overlapped with some of the plurality of pixel electrodes; and a plurality of routing wires connected to the plurality of common-touch electrodes respectively, and extended in parallel with each other, wherein the plurality of routing wires are overlapped with the plurality of data lines with a first insulation layer therebetween, or the plurality of gate lines, and wherein the plurality of common-touch electrodes are respectively connected to the plurality of routing wires via contact holes passing through a second insulation layer covering the plurality of routing wires.

The first insulating layer is a first passivation layer made of an inorganic insulating material, and the second insulation layer is a first planarization layer made of an organic insulating material.

The first insulating layer is a first passivation layer made of an inorganic insulating material, and the second insulation layer is a second planarization layer made of an organic insulating material, and a first planarization layer is disposed between the first passivation layer and the second planarization layer.

The plurality of common-touch electrodes are respectively connected to the plurality of routing wires via contact holes passing through the second planarization layer.

The first insulating layer is a planarization layer made of an organic insulating material, the second insulation layer is a first passivation layer made of an inorganic insulating material, and the planarization layer has concave portions at positions where the planarization layer is overlap with the plurality of routing wires.

The plurality of routing wires are accommodated in the concave portions.

The plurality of common-touch electrodes are respectively connected to the plurality of routing wires via contact holes passing through the first passivation layer.

The first insulating layer is a first passivation layer made of an inorganic insulating material, the second insulation layer is a second passivation layer made of an inorganic insulating material, and a planarization layer is disposed between the first passivation layer and the second passivation layer.

The self-capacitive touch sensor integrated type display device further comprises a third passivation layer having protrusion portions at positions where the data lines and the routing wiring overlap each other, wherein the pixel electrodes are disposed on the third passivation layer.

The self-capacitive touch sensor integrated type display device further comprises a second substrate disposed opposite to the first substrate with a liquid crystal layer therebetween; a color filter-black matrix layer disposed on the second substrate; and column spacers disposed on the color filter-black matrix layer at positions corresponding to the protrusion portions of the third passivation layer to maintain a cell gap with the first substrate.

Advantageous Effects

According to the self-capacitance touch sensor integrated type display device of this disclosure, it is possible to reduce the parasitic capacitance formed between a routing wire and other common-touch electrodes not connected to the routing wire but through which the routing wire passes.

Also, it is possible to reduce the parasitic capacitance between the data line and the routing line because a distance between the data line and the routing wire increases.

Also, it is possible to compensate a step coverage of an upper structure due to the routing wire because the routing wire is disposed in a concave portion of a planarization film made of an organic insulating material. Further, it is possible to reduce a process forming additional insulation layers by adjusting the thickness of the planarization layer as well as to reduce the resistance of the routing wiring by increasing the thickness of the routing wiring.

Also, it is possible to increase the capacitance of the storage capacitor formed by the common-touch electrodes and pixel electrodes.

BEST MODE

Figure 1:
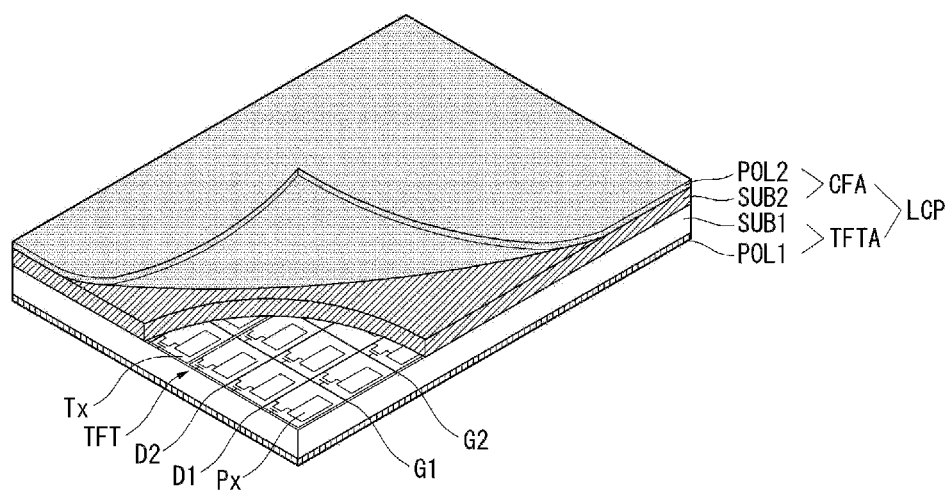
FIG. 1 is a partial exploded perspective view schematically illustrating a touch sensor integrated type display device according to an exemplary embodiment of this disclosure.

Hereinafter, exemplary embodiments of this invention will be described in detail with reference to the accompanying drawings, wherein same reference numerals may be used to denote the same or substantially the same elements throughout the specification and the drawings.

Figure 2:
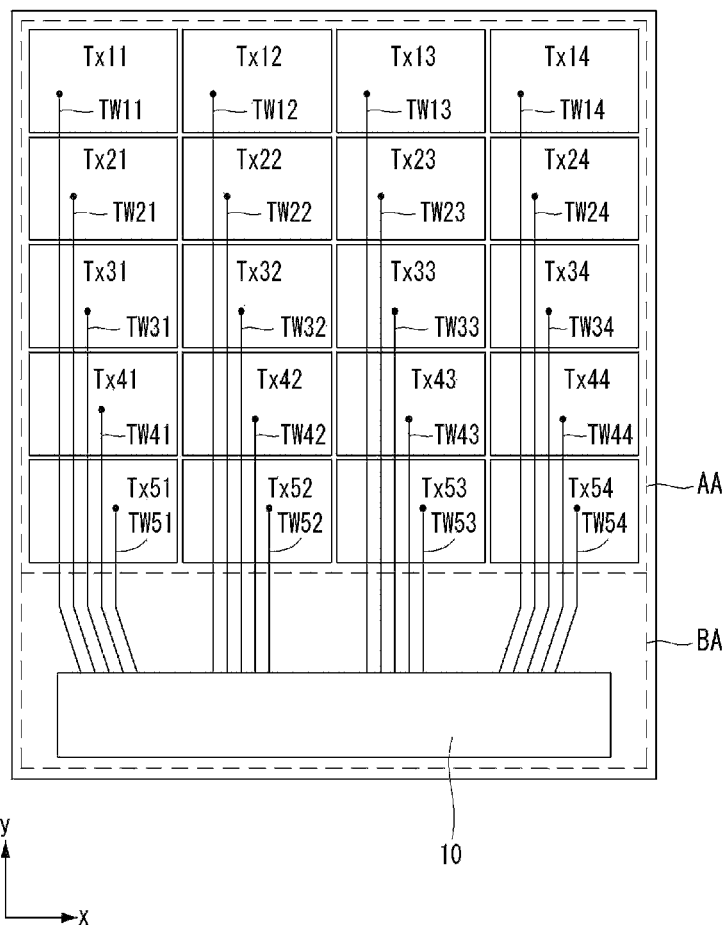
FIG. 2 is a plan view schematically illustrating a configuration of the common-touch electrodes and the routing wires connected thereto of the touch sensor integrated type display device shown in FIG. 1.

First of all, a touch sensor integrated type display device according to an embodiment of this disclosure will be described with reference to FIG. 1 and FIG. 2. FIG. 1 is a partial exploded perspective view schematically illustrating a touch sensor integrated type display device according to an exemplary embodiment of this disclosure, and FIG. 2 is a plan view schematically illustrating a configuration of the common-touch electrodes and the routing wires connected thereto of the touch sensor integrated type display device shown in FIG. 1.

Referring to FIG. 1, the touch sensor integrated type display device according to an embodiment of this disclosure includes a liquid crystal display panel LCP having a thin film transistor array TFTA and a color filter array CFA arranged opposite to each other with a liquid crystal layer (not shown) interposed therebetween.

The thin film transistor array TFTA includes a plurality of gate lines G1 and G2 arranged in a first direction (for example, x-axis direction) on a first substrate SUB1, a plurality of data lines D1 and D2 arranged in a second direction (for example, y-axis direction) crossing the plurality of gate lines G1 and G2 on a first substrate, thins film transistors TFT neighbored to areas where the crossings of the plurality of gate lines G1 and G2 and the date lines D1 and D2, a plurality of pixel electrodes Px for charging a data voltage to liquid crystal cells, and a common electrodes COM arranged to face the plurality of pixel electrodes Px.

The common electrode COM is divided along a first direction (for example, an x-axis direction) and a second direction (for example, a y-axis direction). The common electrodes COM drives liquid crystal molecules in the liquid crystal layer during a display operation, and functions as touch electrodes during a touch driving and sensing operation. Therefore, for convenience of explanation, the common electrode will be referred to as common-touch electrode.

The color filter array CFA includes black matrixes (not shown) and color filters (not shown), which are formed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the TFT array TFTA and the color filter array CFA of the liquid crystal display panel LCP to maintain cell gaps of the liquid crystal cells.

The common-touch electrodes are formed on the second substrate SUB2 in a vertical electric field driving manner such as a twisted nematic (TN) mode and a vertical alignment (VA) mode. Further, the common-touch electrodes are formed on the first substrate SUB1 along with the pixel electrodes Px in a horizontal electric field driving manner such as an in-plane switching (IPS) mode and a fringe field switching (FFS) mode. In the following description, the embodiment of this disclosure is described based on the horizontal electric field driving manner as an example.

Referring to FIG. 2, the touch sensor integrated type display device of this disclosure includes an active area AA in which common-touch electrodes are arranged and data is displayed, and a bezel area BA disposed outside the active area TA. The bezel area BA includes various wires and a display driving and touch sensing IC 10.

Although the common-touch electrodes are arranged in five rows and four columns in the embodiment of FIG. 2, it is to be understood that this disclosure is not limited thereto, but is merely an example for explanation.

The plurality of common-touch electrodes Tx11 to Tx14, Tx21 to Tx24, Tx31 to Tx34, Tx41 to Tx44 and Tx51 to T54 are arranged in the first direction and the second direction intersecting each other in the active area AA. A plurality of routing wires TW11 to TW14, TW21 to TW24, TW31 to TW34, TW41 to TW44 and TW51 to TW54 are respectively connected to the plurality of common-touch electrodes Tx11 to Tx14, Tx21 to Tx24, Tx31 to Tx34, Tx41 to Tx44, TW51 to TW54, and extended from the active area AA to the bezel area BA along the second direction.

More specifically, a (1-1)-th routing wire TW11 is connected to the common-touch electrode Tx11 disposed at a first row and a first column. The (1-1)-th routing wire TW11 extends from the active area AA to the bezel area BA to be connected to the display driving and touch sensing IC 10. A (2-1)-th routing wire TW21 is connected to the common-touch electrode Tx21 disposed at a second row and the first column. The (2-1)-th routing wire TW21 extends from the active area AA to the bezel area BA to be connected to the display driving and touch sensing IC 10. A (3-1)-th routing wire TW31 is connected to the common-touch electrode Tx31 disposed at a third row and the first column. The (3-1)-th routing wire TW31 extends from the active area AA to the bezel area BA to be connected to the display driving and touch sensing IC 10. A (4-1)-th routing wire TW41 is connected to the common-touch electrode Tx41 disposed at a fourth row and the first column. The (4-1)-th routing wire TW41 extends from the active area AA to the bezel area BA to be connected to the display driving and touch sensing IC 10. A (5-1)-th routing wire TW51 is connected to the common-touch electrode Tx51 disposed at a fifth row and the first column. The (5-1)-th routing wire TW51 extends from the active area AA to the bezel area BA to be connected to the display driving and touch sensing IC 10.

In this manner, a (1-2)-th to a (5-2)-th routing wires TW12 to TW52 are connected to a (1-2)-th to a (5-2)-th touch-drive electrodes Tx12 to Tx52 arranged in a second column. The (1-2)-th to the (5-2)-th routing wires TW12 to TW52 are extended from the active area AA to the bezel area BA in parallel and connected to the display driving and touch sensing IC 10.

Also, a (1-3)-th to a (5-3)-th routing wires TW13 to TW53 are connected to a (1-3)-th to a (5-3)-th touch-drive electrodes Tx13 to Tx53 arranged in a third column. The (1-3)-th to the (5-3)-th routing wires TW13 to TW53 are extended from the active area AA to the bezel area BA in parallel and connected to the display driving and touch sensing IC 10.

Also, a (1-4)-th to a (5-4)-th routing wires TW14 to TW54 are connected to a (1-4)-th to a (5-4)-th touch-drive electrodes Tx14 to Tx54 arranged in a fourth column. The (1-4)-th to the (5-4)-th routing wires TW14 to TW54 are extended from the active area AA to the bezel area BA in parallel and connected to the display driving and touch sensing IC 10.

During the display driving operation, the display driving and touch driving IC 10 disposed in the bezel area BA drives the gate lines (not shown) of the display device supplies display data to the data lines, and a common voltage to the common-touch electrodes. During the touch driving operation, the display driving and touch sensing IC 10 supplies a touch driving voltage to the common and touch electrodes and scans changes in capacitance of the common-touch electrodes before and after the touch events to detect the touch positions of the common-touch electrodes.

The various wirings disposed in the bezel area BA include the (1-1)-th to the (5-4)th routing wires TW11 to TW54 are respectively connected to the (1-1)-th to the (5-4)-th common-touch electrodes Tx11 to Tx54 and extended from the region AA, the gate lines (not shown) and the data lines (not shown) connected to the display driving and touch sensing IC 10.

According to the touch sensor integrated type display device of the embodiment of this disclosure, the bezel area BA is not require additional areas for the routing wires at the right and left sides of the active area AA because the routing wires TW11 to TW51, TW12 to TW52, TW13 to TW53, TW14 to TW54 connected to the common-touch electrodes Tx11 to Tx51, Tx12 to Tx52, Tx13 to Tx53 and Tx14 to Tx54 are extended along the second direction (y-axis direction). Therefore, it is possible to obtain a touch sensor integrated type display device having a narrow bezel area.

Figure 3:
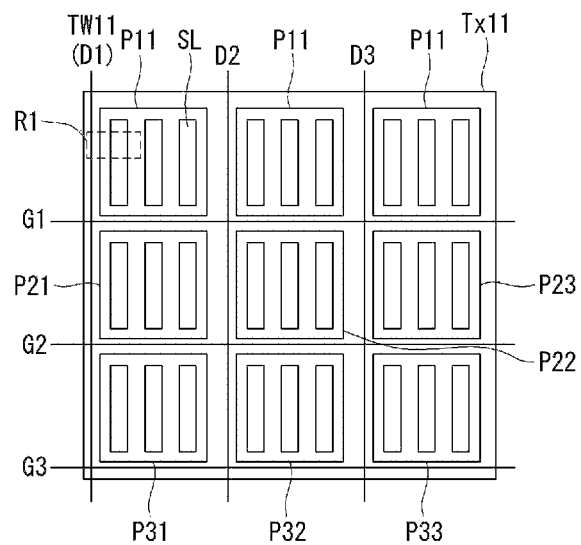
FIG. 3 is a plan view schematically illustrating a relationship between pixel electrodes and one common-touch electrode in a region corresponding to the one common-touch electrode shown in FIG. 2.
Figure 4:
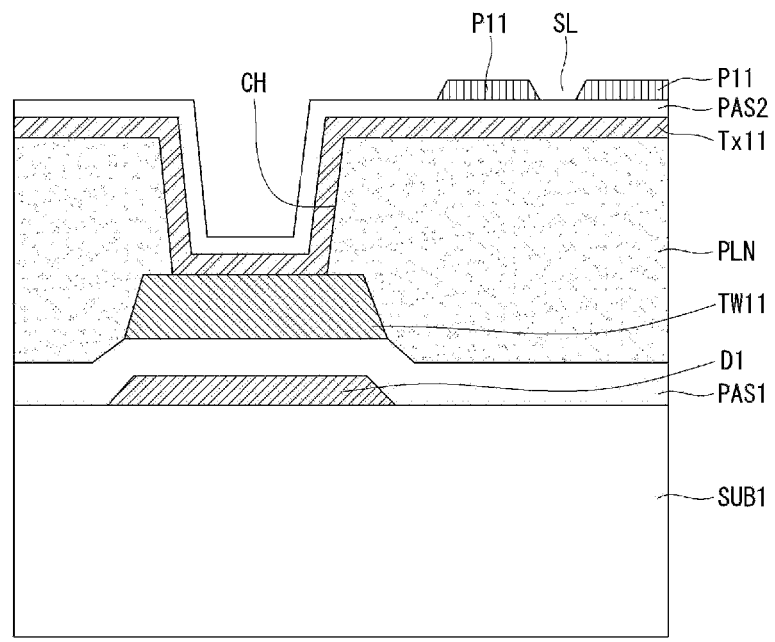
FIG. 4 is a cross-sectional view illustrating a first example of a region corresponding to the region R1 in FIG. 3.
Figure 5:
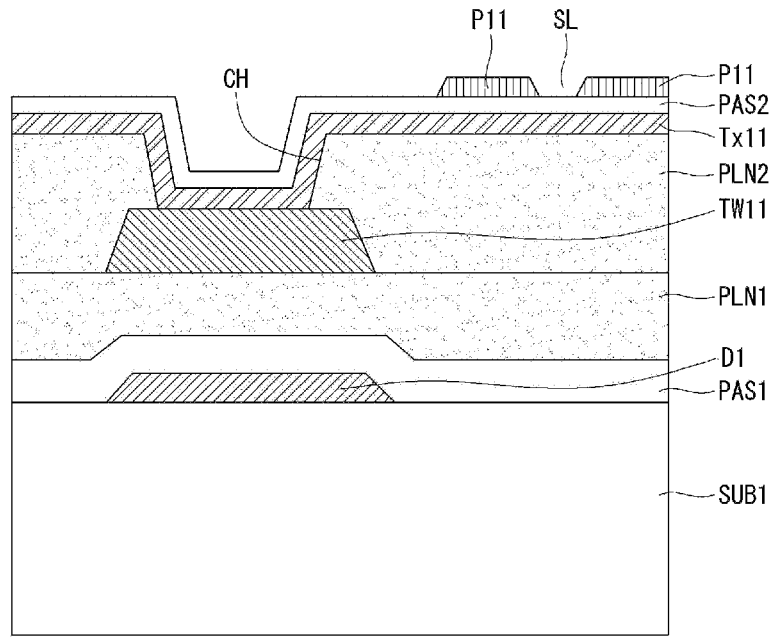
FIG. 5 is a cross-sectional view illustrating a second example of a region corresponding to the region R1 in FIG. 3.
Figure 6:
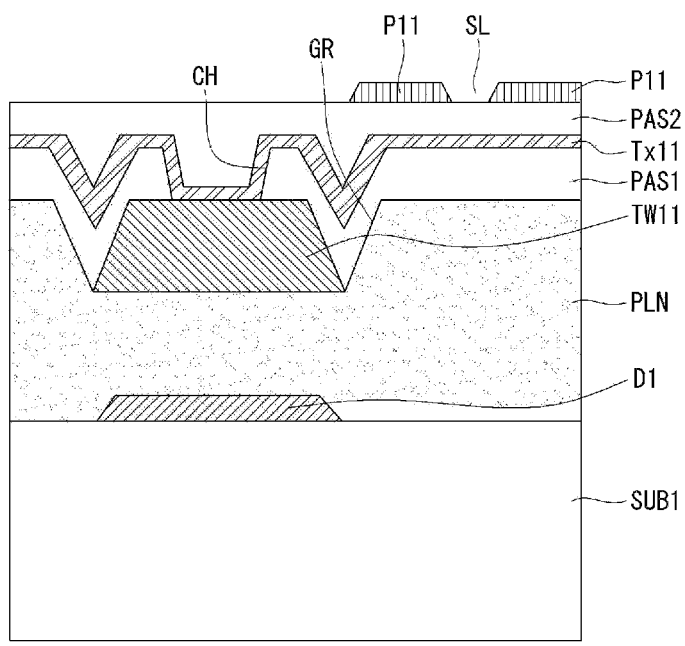
FIG. 6 is a cross-sectional view illustrating a third example of a region corresponding to the region R1 in FIG. 3
Figure 7:
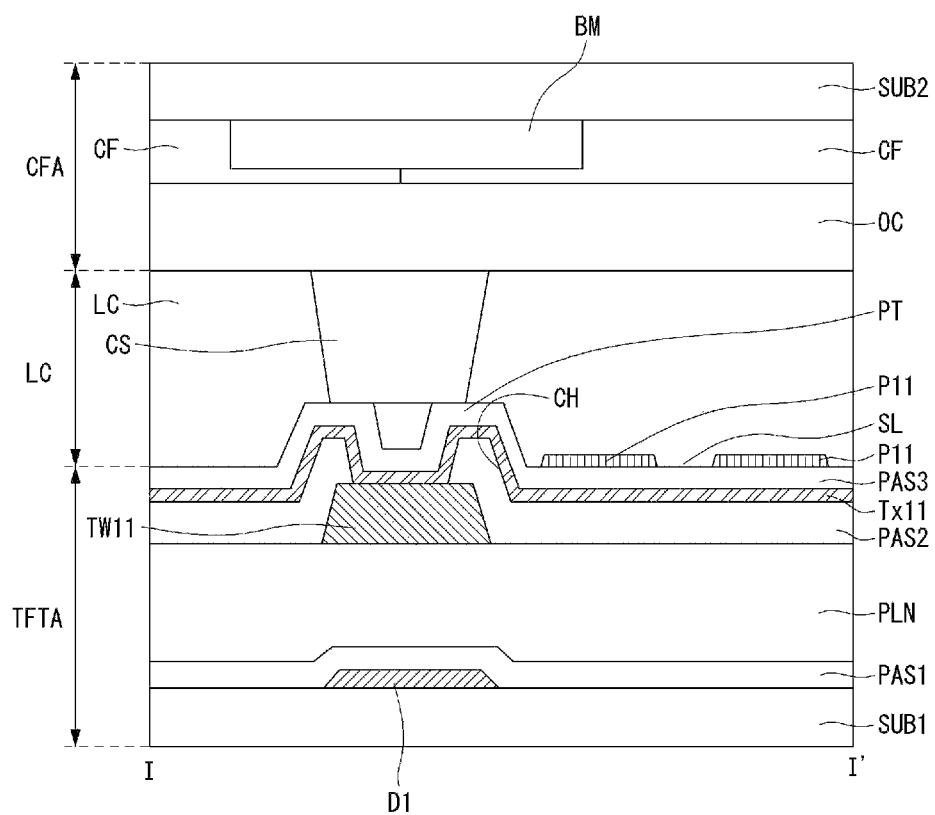
FIG. 7 is a cross-sectional view illustrating a fourth example of a region corresponding to the region R1 in FIG. 3.

Next, cross-sectional structures of various examples according to the embodiment of this disclosure will be described with reference to FIGS. 3 to 7. FIG. 3 is a plan view schematically illustrating a relationship between pixel electrodes and one common-touch electrode in a region corresponding to the one common-touch electrode shown in FIG. 2. FIG. 4 is a cross-sectional view illustrating a first example of a region corresponding to the region R1 in FIG. 3, FIG. 5 is a cross-sectional view illustrating a second example of a region corresponding to the region R1 in FIG. 3, FIG. 6 is a cross-sectional view illustrating a third example of a region corresponding to the region R1 in FIG. 3, and FIG. 7 is a cross-sectional view illustrating a fourth example of a region corresponding to the region R1 in FIG. 3.

In order to avoid the complexity of the description, a thin film transistor, which is a known component of the touch sensor integrated type display device, is omitted from FIGS. 3 to 7. Also, each of the common-touch electrodes Tx12 to Tx54 in the first row and the second column to the fifth row and the fourth column in FIG. 2 is the same as that shown in FIG. 3. Therefore, the description thereof will be omitted.

In FIG. 3, the (1-1)-th common-touch electrode Tx11 disposed in the first row and the first column corresponds to nine pixel electrodes P11, P12, . . . and P33. It should be understood that this disclosure is not limited thereto but is merely an example for explanation.

Referring to FIGS. 3 and 4, on the first substrate SUB1 of the touch sensor integrated type display device according to the first example of this disclosure, a source-drain electrode layer including source and drain electrodes of thin film transistors and data lines D1 to D3 connected to the source electrodes is disposed. Each of the data lines (e.g. D1) is extended along the second direction (e.g., y-axis direction). The source-drain electrode layer may be a single layer or multi-layers formed using material selected from a group including aluminum (Al), copper (Cu), molybdenum (Mo), chromium (Cr), titanium (Ti), gold (Au), Tungsten (W), or an alloy thereof.

The source-drain electrode layer is covered with a first passivation layer PAS1. The first passivation layer PAS1 may be an inorganic insulating layer such as silicon nitride (SiNx) or silicon oxide (SiOx), or multi-layers thereof.

On the first passivation layer PAS1, a routing wire TW1 is arranged in parallel with the data lines D1 to D3. The routing wire TW1 is disposed to overlap the data line D1. Therefore, it is possible to prevent aperture ratio from being lowered even if the routing wire is disposed in the active region because the routing wire is overlapped with the data line.

The routing wire TW1 may be selected from a group including aluminum (Al), copper (Cu), molybdenum (Mo), chromium (Cr), titanium (Ti), gold (Au), Tungsten (W), or an alloy thereof as in the case of the data lines.

A planarization layer PLN is disposed on the first passivation layer PAS1 on which the routing wire TW11 is disposed to cover the routing wire TW11. The planarization layer PLN may be made of an organic insulating material such as polyacryl or polyimide. The planarization layer PLN includes a contact hole CH exposing a portion of the routing wiring TW11.

Common-touch electrodes Tx11 to Tx 54 (see FIG. 2) are disposed on the planarization layer PLN. Each of the common-touch electrodes (e.g. Tx11) is connected to the routing wiring TW11 exposed through the contact hole CH formed in the planarization layer PLN. The common-touch electrodes may be disposed in at least two rows and two columns. The common-touch electrodes may be selected from transparent conductive materials such as ITO (Indium Tin Oxide), IZO (Indium Zinc Oxide), and GZO (Gallium-doped Zinc Oxide).

A second passivation layer PAS2 is disposed on the planarization layer PLN on which the common-touch electrodes Tx11 to Tx54 are disposed to cover the common-touch electrodes Tx11 to Tx54. The second passivation layer PAS2 may be formed of an inorganic insulating materials such as silicon nitride (SiNx) or silicon oxide (SiOx).

Pixel electrodes P11 to P33, each (e.g. P11) of which having a plurality of slits SL, are disposed on the second passivation layer PAS2. The pixel electrodes P11 to P33 are arranged to overlap the common-touch electrode Tx11. The pixel electrodes P11 to P33 may be selected from transparent conductive materials such as ITO (Indium Tin Oxide), IZO (Indium Zinc Oxide), and GZO (Gallium-doped Zinc Oxide) as the common-touch electrode.

In the touch sensor integrated type display device according to the first example of this disclosure, the planarization layer PLN for insulating the routing wire TW11 from the common-touch electrode Tx11 is formed of the organic insulating material, and the second passivation layer PAS2 for insulating the common-touch electrode Tx11 from the pixel electrodes P11 to P33 is formed of the inorganic insulating film such as silicon oxide or silicon nitride. As such, when the routing wire TW11 is disposed on a layer different from the common-the touch electrode Tx11, it is possible to adjust the thickness of the second passivation layer PAS2 and the thickness of the planarization layer PLN without any restriction on each other. For, example, if the thickness of the second passivation layer PAS2 between the common-the touch electrode Tx11 and the pixel electrodes P1 to T33 is made thinner, the planarization layer PLN can be made thick. Therefore, since the thickness of the second passivation layer PAS2 can be reduced, it is possible to increase the capacitance of the storage capacitor formed by the common-touch electrode Tx11 and the pixel electrode P11 to P33.

Further, in the touch sensor integrated type display device according to the first example of this disclosure, the routing wire TW11 is disposed under the planarization layer PLN made of the organic insulating material. Since the planarization layer PLN made of the organic insulating material has good reactivity, it can be formed thick. Therefore, if the planarization layer PLN is thickened, the gap between the routing wire TW11 and the common-touch electrode Tx11 will be increased. Therefore, it is possible to reduce the parasitic capacitance generated between the routing wire TW11 and the other common-touch electrodes (for example, Tx21, Tx31, Tx41, and Tx51 in FIG. 2) which are not connected to the routing wire TW11 but through which through the routing wiring TW11 passes.

Referring to FIGS. 3 and 5, on the first substrate SUB1 of the touch sensor integrated type display device according to the second example of this disclosure, a source-drain electrode layer including source and drain electrodes of thin film transistors and data lines D1 to D3 connected to the source electrodes is disposed. Each of the data lines (e.g. D1) is extended along the second direction (e.g., y-axis direction). The source-drain electrode layer may be a single layer or multi-layers formed using material selected from a group including aluminum (Al), copper (Cu), molybdenum (Mo), chromium (Cr), titanium (Ti), gold (Au), Tungsten (W), or an alloy thereof.

The source-drain electrode layer is sequentially covered with a first passivation layer PAS1 and a first planarization layer PLN1. The first passivation layer PAS1 may be an inorganic insulating layer such as silicon nitride (SiNx) or silicon oxide (SiOx). The first planarization layer PLN1 may be made of an organic insulating material such as polyacryl or polyimide.

On the first planarization layer PLN1, a routing wire TW1 is arranged in parallel with the data lines D1 to D3. The routing wire TW1 is disposed to overlap the data line D1. Therefore, it is possible to prevent aperture ratio from being lowered even if the routing wire is disposed in the active region because the routing wire is overlapped with the data line.

The routing wire TW1 may be selected from a group including aluminum (Al), copper (Cu), molybdenum (Mo), chromium (Cr), titanium (Ti), gold (Au), Tungsten (W), or an alloy thereof as in the case of the data lines.

A second planarization layer PLN2 is disposed on the first planarization layer PLN1 on which the routing wire TW11 is disposed to cover the routing wire TW11. The second planarization layer PLN2 may be made of an organic insulating material such as polyacryl or polyimide. The second planarization layer PLN2 includes a contact hole CH exposing a portion of the routing wiring TW11.

Common-touch electrodes Tx11 to Tx 54 (see FIG. 2) are disposed on the second planarization layer PLN2. Each of the common-touch electrodes (e.g. Tx11) is connected to the routing wiring TW11 exposed through the contact hole CH formed in the second planarization layer PLN2. The common-touch electrodes may be disposed in at least two rows and two columns. The common-touch electrodes may be selected from transparent conductive materials such as ITO (Indium Tin Oxide), IZO (Indium Zinc Oxide), and GZO (Gallium-doped Zinc Oxide).

A second passivation layer PAS2 is disposed on the second planarization layer PLN2 on which the common-touch electrodes Tx11 to Tx54 are disposed to cover the common-touch electrodes Tx11 to Tx54. The second passivation layer PAS2 may be formed of an inorganic insulating materials such as silicon nitride (SiNx) or silicon oxide (SiOx).

Pixel electrodes P11 to P33, each (e.g. P11) of which having a plurality of slits SL, are disposed on the second passivation layer PAS2. The pixel electrodes P11 to P33 are arranged to overlap the common-touch electrode Tx11. The pixel electrodes P11 to P33 may be selected from transparent conductive materials such as ITO (Indium Tin Oxide), IZO (Indium Zinc Oxide), and GZO (Gallium-doped Zinc Oxide) as the common-touch electrode.

In the touch sensor integrated type display device according to the second example of this disclosure, the second planarization layer PLN2 for insulating the routing wire TW11 from the common-touch electrode Tx11 is formed of the organic insulating material, and the second passivation layer PAS2 for insulating the common-touch electrode Tx11 from the pixel electrodes P11 to P33 is formed of the inorganic insulating film such as silicon oxide or silicon nitride. For this reason, it is possible to adjust that the thickness of the second passivation layer PAS2 positioned at an upper side is thin and the thickness of the second planarization layer PLN2 positioned at a lower side is thick. Therefore, it is possible to increase the capacitance of the storage capacitor formed by the common-touch electrode Tx11 and the pixel electrode P11 to P33 as in the case of the first example of this disclosure.

Also, in the touch sensor integrated type display device according to the second example of this disclosure, the routing wiring TW11 is disposed under the second planarization layer PLN2 made of an organic insulating material. Therefore, it is possible to reduce the parasitic capacitance generated between the routing wire TW11 and the other common-touch electrodes (for example, Tx21, Tx31, Tx41, and Tx51 in FIG. 2) which are not connected to the routing wire TW11 but through which the routing wiring TW11 passes as in the case of the first example of this disclosure.

Further, in the touch sensor integrated type display device according to the second example of this disclosure, the routing wiring TW11 is disposed between the first passivation layer PAS1 and the second planarization layer PLN2. Therefore, it is possible to reduce the parasitic capacitance between the data line D1 and the routing wiring TW11 since the distance between the data line D1 and the routing wiring TW11 is increased by the first planarization layer PLN1.

Referring to FIGS. 3 and 6, on the first substrate SUB1 of the touch sensor integrated type display device according to the third example of this disclosure, a source-drain electrode layer including source and drain electrodes of thin film transistors and data lines D1 to D3 connected to the source electrodes is disposed. Each of the data lines (e.g. D1) is extended along the second direction (e.g., y-axis direction). The source-drain electrode layer may be a single layer or multi-layers formed using material selected from a group including aluminum (Al), copper (Cu), molybdenum (Mo), chromium (Cr), titanium (Ti), gold (Au), Tungsten (W), or an alloy thereof.

The source-drain electrode layer is covered with a planarization layer PLN made of an organic insulating material such as polyacryl or polyimide. A routing wire TW1 is disposed on the planarization layer PLN to be in parallel with the data lines D2 and D3 and be overlapped with the data line D1. Accordingly, it is possible to prevent aperture ratio from being lowered even if the routing wire is disposed in the active region because the routing wire is overlapped with the data line.

The planarization layer PLN may have a concave portion GR corresponding to a region where the routing wiring TW1 and the data line D1 overlap. When the concave portion GR is formed in the planarization layer PLN, the first routing wiring TW1 can be accommodated in the concave portion GR.

The routing wire TW1 may be selected from a group including aluminum (Al), copper (Cu), molybdenum (Mo), chromium (Cr), titanium (Ti), gold (Au), Tungsten (W), or an alloy thereof as in the case of the data lines.

A first passivation layer PAS1 is disposed on the planarization layer PLN on which the routing wire TW11 is disposed to cover the routing wire TW11. The first passivation layer PAS1 includes a contact hole CH exposing a portion of the routing wire TW1. The first passivation layer PAS1 may be made of an inorganic insulating material such as silicon nitride (SiNx) or silicon oxide (SiOx).

Common-touch electrodes Tx11 to Tx 54 (see FIG. 2) are disposed on the first passivation layer PAS1. Each of the common-touch electrodes (e.g. Tx11) is connected to the routing wiring TW11 exposed through the contact hole CH formed in the first passivation layer PAS1. The common-touch electrodes may be disposed in at least two rows and two columns. The common-touch electrodes may be selected from transparent conductive materials such as ITO (Indium Tin Oxide), IZO (Indium Zinc Oxide), and GZO (Gallium-doped Zinc Oxide).

A second passivation layer PAS2 is disposed on the first passivation layer PAS1 on which the common-touch electrodes Tx11 to Tx54 are disposed to cover the common-touch electrodes Tx11 to Tx54. The second passivation layer PAS2 may be formed of an inorganic insulating materials such as silicon nitride (SiNx) or silicon oxide (SiOx).

Pixel electrodes P11 to P33, each (e.g. P11) of which having a plurality of slits SL, are disposed on the second passivation layer PAS2. The pixel electrodes P11 to P33 are arranged to overlap the common-touch electrode Tx11. The pixel electrodes P11 to P33 may be selected from transparent conductive materials such as ITO (Indium Tin Oxide), IZO (Indium Zinc Oxide), and GZO (Gallium-doped Zinc Oxide) as the common-touch electrode.

In the touch sensor integrated type display device according to the third example of this disclosure, the first passivation layer PAS1 for insulating the routing wire TW11 from the common-touch electrode Tx11 and the second passivation layer PAS2 for insulating the common-touch electrode Tx11 from the pixel electrodes P11 to P33 are formed of the inorganic insulating film such as silicon oxide or silicon nitride. For this reason, it is possible to adjust that the thickness of the second passivation layer PAS2 positioned at an upper side is thin and the thickness of the first passivation layer PAS1 positioned at a lower side is thick. Therefore, it is possible to increase the capacitance of the storage capacitor formed by the common-touch electrode Tx11 and the pixel electrode P11 to P33 because the thickness of the second passivation layer PAS2 can be adjusted to be thick.

Also, in the touch sensor integrated type display device according to the third example of this disclosure, a supplementary passivation layer (not shown) may be disposed between the planarization layer PLN and the data lines D1 to D3 to cover the data lines D1 to D3. In this case, it is possible to reduce the parasitic capacitance generated between the routing wire TW11 and the data line D1 because the distance of the routing wire TW11 and the data line D1 increases by a total thickness of the supplementary passivation layer and the planarization layer PLN. However, even if the supplementary passivation layer (for example, the first passivation layer of the first and second examples) is omitted as shown in FIG. 6, it is possible to reduce the parasitic capacitance between the data line D1 and the routing wire TW11 as well as the number of deposition process for forming the supplementary passivation layer by simply adjusting the thickness of the supplementary planarization layer. In addition, since the routing wiring TW11 is accommodated in the concave portion GR of the planarization layer PLN made of an organic insulating material, the step difference of the upper structure due to the routing wiring TW11 can be compensated.

Also, in the touch sensor integrated type display device according to the third example of this disclosure, it is possible to reduce the resistance of the routing wire TW11 because the thickness of the routing wire TW11 can be increased by adjusting the thickness of the planarization layer PLN1 and the depth of the concave portion GR.

Referring to FIGS. 3 and 7, the touch sensor integrated type display device according to the fourth example of this disclosure includes a first thin film transistor array TFTA and a color filter array CFA arranged opposite to each other with a liquid crystal layer LC interposed therebetween.

On a first substrate SUB1 of the first thin film transistor array TFTA, a source-drain electrode layer including source and drain electrodes of thin film transistors and data lines D1 to D3 connected to the source electrodes is disposed. Each of the data lines (e.g. D1) is extended along the second direction (e.g., y-axis direction). The source-drain electrode layer may be a single layer or multi-layers formed using material selected from a group including aluminum (Al), copper (Cu), molybdenum (Mo), chromium (Cr), titanium (Ti), gold (Au), Tungsten (W), or an alloy thereof.

The source-drain electrode layer is sequentially covered with a first passivation layer PAS1 and a planarization layer PLN. The first passivation layer PAS1 may be made of an inorganic insulating material such as silicon nitride (SiNx) or silicon oxide (SiOx). The planarization layer PLN may be made of an organic insulating material such as polyacryl or polyimide.

A routing wire TW1 is disposed on the first planarization layer PLN1 to be in parallel with the data lines D2 and D2 and be overlapped with the data line D1. Accordingly, it is possible to prevent aperture ratio from being lowered even if the routing wire is disposed in the active region because the routing wire is overlapped with the data line.

The routing wire TW1 may be selected from a group including aluminum (Al), copper (Cu), molybdenum (Mo), chromium (Cr), titanium (Ti), gold (Au), Tungsten (W), or an alloy thereof as in the case of the data lines.

A second passivation layer PAS2 is disposed on the planarization layer PLN on which the routing wire TW11 is disposed to cover the routing wire TW11. The second passivation layer PAS2 may be made of an inorganic insulating material such as silicon nitride (SiNx) or silicon oxide (SiOx). The second passivation layer PAS2 includes a contact hole CH exposing a portion of the routing wire TW1.

Common-touch electrodes Tx11 to Tx54 (see FIG. 2) are disposed on the second passivation layer PAS2. Each of the common-touch electrodes (e.g. Tx11) is connected to the routing wiring TW11 exposed through the contact hole CH formed in the second passivation layer PAS2. The common-touch electrodes may be disposed in at least two rows and two columns. The common-touch electrodes may be selected from transparent conductive materials such as ITO (Indium Tin Oxide), IZO (Indium Zinc Oxide), and GZO (Gallium-doped Zinc Oxide).

A third passivation layer PAS3 is disposed on the second passivation layer PAS2 on which the common-touch electrodes Tx11 to Tx54 are disposed to cover the common-touch electrodes Tx11 to Tx54. The third passivation layer PAS3 may be formed of an inorganic insulating materials such as silicon nitride (SiNx) or silicon oxide (SiOx).

Pixel electrodes P11 to P33, each (e.g. P11) of which having a plurality of slits SL, are disposed on the third passivation layer PAS3. The pixel electrodes P11 to P33 are arranged to overlap the common-touch electrode Tx11. The pixel electrodes P11 to P33 may be selected from transparent conductive materials such as ITO (Indium Tin Oxide), IZO (Indium Zinc Oxide), and GZO (Gallium-doped Zinc Oxide) as the common-touch electrode.

On a second substrate SUB2 of the color filter array CFA, color filters CF and a black matrix BM for partitioning the color filters CF are disposed. The black matrix BM is disposed at a position overlapping the data line D1 and the routing wiring TW11. An overcoat layer OC is disposed on an entire surface of the second substrate SUB2 on which the color filters CF and the black matrix BM are disposed. On the overcoat layer OC, column spacers CS for maintaining the cell gap between the first substrate SUB1 and the second substrate SUB2 are disposed. At least some of the column spacers CS may be disposed at positions overlapping the data line D1 and the routing wiring TW11.

In the touch sensor integrated type display device according to the fourth example of this disclosure, the routing wire TW11 is disposed at an upper side of the planarization layer PLN made of the inorganic material. And also, the second passivation layer PAS2, the common-touch electrode Tx11 and the third passivation layer PAS3 are sequentially disposed on the planarization layer PLN to cover the routing wire TW11. Accordingly, the third passivation layer PAS3 has a protrusion portion PT at a position where the data line D1 and the routing wiring TW11 overlap each other. The protrusion portion PT of the third passivation layer PAS3 overlaps with the position of the column spacer CS, and thus acts as a bump spacer. Therefore, it is possible to prevent light leakage phenomenon that may occur around an area in which the column spacer CS are formed.

In the touch sensor integrated type display device according to the fourth example of this disclosure, the second passivation layer PAS2 for insulating the routing wire TW11 from the common-touch electrode Tx11 and the third passivation layer PAS3 for insulating the common-touch electrode Tx11 from the pixel electrodes P11 to P33 are formed of the inorganic insulating materials such as silicon oxide or silicon nitride. Accordingly, the thickness of the third passivation layer PAS3 positioned at an upper side portion can be made thin, and the thickness of the second passivation layer PAS2 positioned at a lower side can be made thick. Therefore, it is possible to reduce the capacitance of the storage capacitor formed by the common-touch electrode Tx11 and the pixel electrode P11 to P33 because the thickness of the third passivation layer PAS3 can be made thin. Also, since the thickness of the second passivation layer PAS2 can be adjusted to be thick, it is possible to reduce the parasitic capacitance generated between the routing wire TW11 and the other common-touch electrodes (for example, Tx21, Tx31, Tx41, and Tx51 in FIG. 2) which are not connected to the routing wire TW11 but through which through the routing wiring TW11 passes.

Through the above explanation, it will be apparent to those skilled in the art that various modifications and variations can be made in this disclosure without departing from the spirit or scope of this disclosure.

For example, although it is described that the first direction referred in the examples of this disclosure is the x-axis direction and the second direction is the y-axis direction, it is possible to change the direction to the opposite direction. Also, the size, number and shape of the pixel electrodes corresponding to one common-touch electrode, and the number of the routing wires connected to the common-touch electrodes may be appropriately changed as needed.

Also, in the examples of this disclosure, although it is described that the routing wires are overlapped with the data lines, this disclosure is not limited thereto, that the routing wires may be configured to overlap the gate lines arranged to intersect the data lines.

Accordingly, the scope of this disclosure should not be limited to contents described in the specification, but should be defined by the appended claims.

Embodiments for Implementing this Disclosure

Various embodiments have been described in the best mode for carrying out this disclosure.

INDUSTRIAL APPLICABILITY

This disclosure can be applied to various display devices capable of inputting and outputting information through a screen.

It will be apparent to those skilled in the art that various modifications and variations can be made in this disclosure without departing from the spirit or scope of this disclosure. Accordingly, it is intended that this disclosure covers modifications and variations of this disclosure which come within the scope of the appended claims and their equivalents.

The invention claimed is:

1. A self-capacitive touch sensor integrated type display device, comprising:
   a plurality of gate lines and a plurality of data lines crossing over each other on a first substrate;
   a plurality of routing wires on a first planarization layer comprising an organic insulating material overlapping the plurality of data lines;
   a plurality of common-touch electrodes on a first passivation layer comprising an inorganic insulating material covering the plurality of routing wires; and
   a plurality of pixel electrodes on a second passivation layer comprising the inorganic insulating material covering the plurality of common-touch electrodes,
   wherein the plurality of routing wires overlap the plurality of data lines with the first planarization layer therebetween,
   wherein the plurality of common-touch electrodes are respectively connected to the plurality of routing wires via contact holes passing through the first passivation layer,
   wherein the second passivation layer covers upper and side surfaces of the plurality of common-touch electrodes inside the contact holes in the first passivation layer,
   wherein the first planarization layer has concave portions at positions where the plurality of data lines overlap the plurality of routing wires,
   wherein the plurality of routing wires, portions of the first passivation layer, and portions of the plurality of common-touch electrodes are disposed inside the concave portions.

2. The self-capacitive touch sensor integrated type display device of claim 1, wherein the plurality of common-touch electrodes are respectively connected to the plurality of routing wires via contact holes passing through the first passivation layer.

3. The self-capacitive touch sensor integrated type display device of claim 1, wherein a thickness of the first passivation layer is thinner than that of the first planarization layer, and is thicker than that of the second passivation layer.

4. The self-capacitive touch sensor integrated type display device of claim 1, wherein:
   a thickness of the first passivation layer is thinner than that of the first planarization layer, and is thicker than that of the second passivation layer; and
   a thickness of the first planarization layer is thicker than that of the second passivation layer.

* * * * *